(12) United States Patent
Meyer et al.

(10) Patent No.: US 7,097,671 B2
(45) Date of Patent: Aug. 29, 2006

(54) METHOD OF CLEANING INDUSTRIAL GASES

(75) Inventors: Manfred Meyer, Friedrichsdorf (DE); Ulrich Wagner, Frankfurt am Main (DE); Hans Kammerer, Frankfurt am Main (DE)

(73) Assignee: Lurgi AG, Frankfurt/Main (DE)

( * ) Notice: Subject to any disclaimer, the term of this patent is extended or adjusted under 35 U.S.C. 154(b) by 0 days.

(21) Appl. No.: 10/912,738

(22) Filed: Jul. 30, 2004

(65) Prior Publication Data
US 2005/0035326 A1    Feb. 17, 2005

(30) Foreign Application Priority Data
Aug. 9, 2003    (DE) ................ 103 36 677

(51) Int. Cl.
*B01D 3/00*    (2006.01)
*B01D 9/02*    (2006.01)
*C23F 14/00*    (2006.01)

(52) U.S. Cl. ............ 23/293 R; 23/295 R; 23/313 R; 203/7; 203/18; 203/48; 203/97; 203/DIG. 23

(58) Field of Classification Search ............ 422/245.1; 423/561.1; 203/7, 18, 48, 97, DIG. 23; 23/293 R, 23/295 R, 313 R
See application file for complete search history.

(56) References Cited

U.S. PATENT DOCUMENTS

| 4,861,493 A | * | 8/1989 | Jansen ................. 210/715 |
| 5,091,057 A | * | 2/1992 | Jensen ................. 203/18 |
| 5,863,391 A | * | 1/1999 | Rueter et al. ........... 203/14 |
| 2003/0015412 A1 | * | 1/2003 | Gilbert et al. .......... 203/18 |

FOREIGN PATENT DOCUMENTS

DE    43 36 790 C2 *    5/1995

* cited by examiner

*Primary Examiner*—Stanley S. Silverman
*Assistant Examiner*—Timothy C. Vanoy
(74) *Attorney, Agent, or Firm*—Jonathan Myers; Andrew Wilford

(57) ABSTRACT

A methanol/water scrubbing solution containing colloidal metal sulfides formed from metal carbonyls and resulting from the scrubbing of industrial gases, such as synthesis gas, is subjected to agglomeration of the metal sulfides before the scrubbing solution to be separated enters the separating column which separates the methanol from the water containing precipitated metal sulfides. The agglomeration is carried out in a precipitation vessel and the scrubbing liquid is diluted before it enters the precipitation vessel. The result is minimal encrustation of the trays or other parts of the cleaning plant for the scrubbing solution.

8 Claims, 1 Drawing Sheet

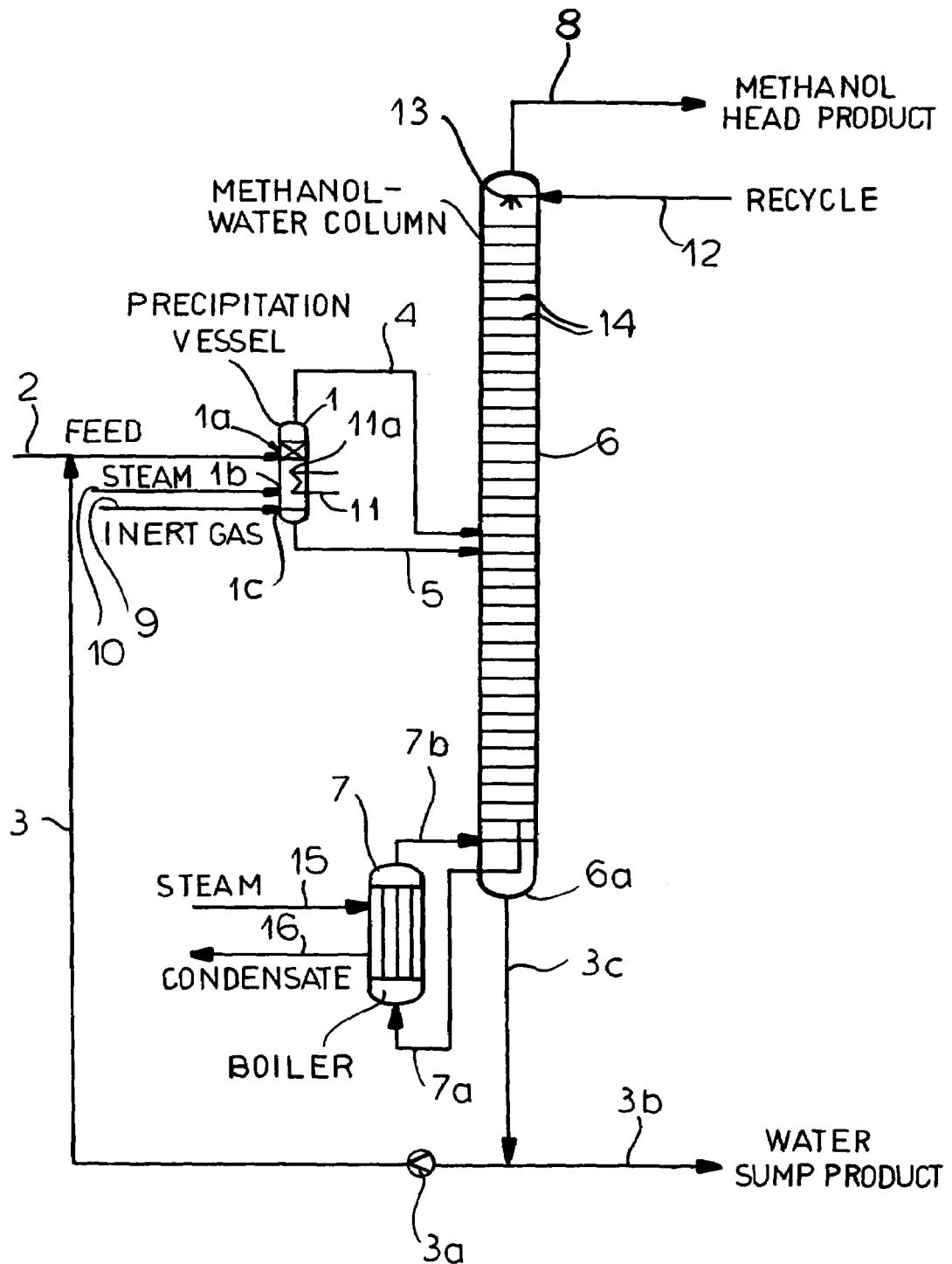

METHOD OF CLEANING INDUSTRIAL GASES

FIELD OF THE INVENTION

Our present invention relates to a method of cleaning industrial gases utilizing a scrubbing with methanol and, more particularly, to a method of and an apparatus for removing colloidal metal sulfides formed from metal carbonyls from a methanol scrubbing solution used to scrub industrial gas, usually synthesis gas, at a low temperature.

BACKGROUND OF THE INVENTION

In the production of industrial gas, for example, synthesis gas, metal carbonyls tend to form from fuels containing heavy metal. These metal carbonyls can be detrimental in many chemical syntheses which can use such synthesis gas. Synthesis gas is comprised basically of hydrogen, hydrocarbons, carbon dioxide and carbon monoxide and may also include a number of byproducts which stem from the raw material used in the production of synthesis gas, including especially $H_2S$, HCN, COS, and HSCN, in addition to the metal carbonyls which have already been mentioned.

From the metal carbonyls, colloidal metal sulfides may be formed in the presence of $H_2S$ and these metal sulfides can encrust or bake onto surfaces of process equipment, including the trays of separating columns and surfaces of fluid passages so that in a short time, those passages can be blocked or the equipment rendered inoperative in whole or in part.

It is thus of advantage to clean the synthesis gas and in the course of cleaning the synthesis gas, to remove colloidal metal sulfides which may have or may be formed from metal cabonyls.

To clean the synthesis gas, a number of techniques have been developed. The one of greatest significance is the Rectisol method. In the Rectisol plant, the crude gas is initially subjected to a HCN removal using a small portion of a regenerated scrubbing liquid, here methanol, in a prescrubbing step. Then the crude gas is scrubbed with the main quantity of the regenerated methanol to absorb $H_2S$ therefrom. Both the prescrubbing methanol and the main scrubbing methanol is charged with substances absorbed from the gas and contain the metal carbonyl.

The method of cleaning industrial gas, especially synthesis gas, by one or more low temperature gas scrubbing stages, utilizes methanol at a temperature of –60° C. to 0° C. and then subjects the methanol to expansion, evacuation, thermal treatment for outgasing and then a further heating step with any additional treatment in a reactor prior to recycling. Such a system has been described, for example, in German patent 26 10 892. With this process, the formation of deposits of heavy metal compounds, especially metal sulfides formed from the metal carbonyls, is prevented in the outgasing column of gas scrubbers and the operating life of such equipment is increased. Nevertheless even with the use of this process, some metal carbonyls which have been unconverted in the prereactor, carbonyls which are dissolved in prescrubbing methanol and metal carbonyls which survive elsewhere in the system can remain in the synthesis gas which may be utilized in reactions in which these metal carbonyls may be detrimental.

A further method for the removal of metal carbonyl compounds in conjunction with cleaning of synthesis gas by low temperature gas scrubbing is known from German open application 43 36 790. In this process, before being admitted to a regenerating column, a highly loaded and a poorly loaded scrubbing liquid stream are heated and each is fed to a reactor. The highly loaded stream of the scrubbing liquid, together with the condensate which is produced by the partial condensation of the vapor from the condensation system of the regenerating column is fed to a reactor providing a sufficient residence time. This method also does not ensure a complete conversion of the metal carbonyl as well as the removal of the sulfides.

The removal of metal sulfides and especially the colloidal metal sulfides resulting from metal carbonyls, above all iron pentacarbonyl and nickel tetracarbonyl, is a significant problem in the recycle gas scrubbing problem to reduce the formation of deposits in the separating column and other parts of the apparatus. For the most endangered parts of the apparatus, cleaning must be carried out at intervals and for such cleaning intervals, there is a standstill of the plant. This approach to dealing with encrustation resulting from colloidal metal sulfides on the trays of the methanol-water separation column (MWC) has not been satisfactory up to now.

OBJECTS OF THE INVENTION

It is, therefore, the principal object of the present invention to provide an improved method of cleaning industrial gases and especially synthesis gases containing metal carbonyls, whereby the problem of encrustation of surfaces of the apparatus resulting from metal sulfides derive from metal carbonyls can be significantly reduced or eliminated.

Another object of this invention is to provide a method of removing colloidal metal sulfides formed from metal carbonyls from a methanol scrubbing solution whereby drawbacks of prior art techniques can be eliminated.

It is also an object of this invention to provide an improved precipitation vessel for use in a method of removing colloidal metal sulfides from a methanol scrubbing solution.

It is also an object of this invention to provide an improved apparatus for carrying out the method of this invention.

Still another object of this invention is to either eliminate the colloidal metal sulfides or to transform them into a form in which this can no longer result in encrustation of various parts of the process apparatus for column trays.

SUMMARY OF THE INVENTION

These objects and others which will become apparent hereinafter are attained, in accordance with the invention, in a method of removing colloid metal sulfides formed from metal carbonyls of a methanol scrubbing solution used to scrub industrial gas, and especially synthesis gas at a low temperature. The method comprises the steps of:

(a) introducing the methanol scrubbing solution containing colloidal metal sulfides formed from metal carbonyls into a precipitation vessel;

(b) heating the methanol scrubbing solution containing colloidal metal sulfides in the precipitation vessel to cause growth and agglomeration of metal sulfide particles therein;

(c) introducing the methanol scrubbing solution containing agglomerated metal sulfides from the precipitation vessel into a methanol/water separation column in which:

a rising stream of methanol vapor is passed in counterflow to a descending stream of water, a head product rich in methanol is removed from the separation column for scrubbing of industrial gas, and a sump product rich in water is removed from the separation column; and (d) removing, in the sump product, metal sulfides from the separation column in the form of larger particles than the particles of the colloidal metal sulfides.

Preferably the method further comprises the steps of:

passing the methanol scrubbing solution containing colloidal metal sulfides continuously through the precipitation vessel, distilling methanol from the methanol scrubbing solution containing colloidal metal sulfides continuously passed through the precipitation vessel during the heating thereof in step (b), withdrawing distilled-off methanol from a head of the precipitation vessel and introducing the distilled-off methanol into the separation column at an upper part thereof, and removing an aqueous solution containing precipitated metal sulfide particles at a bottom of the precipitation vessel and introducing the removed aqueous solution containing precipitated metal sulfide particles into the separation column at a lower portion thereof.

The method thus passes the scrubbing solution before it enters the separating column, i.e. the separation column for the separation of methanol from water, into a precipitation vessel in which the colloid metal sulfides formed from the metal carbonyls are agglomerated to larger particles by heating and so that these larger particles settle out and together with the sump product can be removed from the separating column.

In such a precipitation vessel, process conditions are established to ensure the growth of the metal sulfide particles to a size which enables them to settle from the solution and to be removed as a sump product so that a minimum and in the most opportune cases no metal sulfide will remain in suspension. The method is promoted by the addition of water to the methanol-containing scrubbing solution in order to establish a defined and specific methanol concentration. This water can be either a part of the sump product of the column or recycled water from a water scrubbing stage of the methanol containing Rectisol waste gas. The most effective way of introducing water into the precipitation vessel, however, has been found to be by the addition of low pressure steam which can serve to heat the methanol-water mixture to the boiling point. The addition of steam appears to be particularly effective for the formation of large particle metal sulfide agglomerates and to promote a good mixing of the scrubbing solution and the supplied water. Such mixing can also be promoted or further enhanced by the introduction into the precipitation vessel of an inert gas like nitrogen or carbon dioxide. The term "inert" is here used to indicate a gas which does not react with methanol or substances contained in the methanol scrubbing solution.

According to a feature of the invention, the water is continuously added to the methanol scrubbing solution in the precipitation vessel to lower the methanol concentration. Sulfide particles may be added to the precipitation vessel to serve as crystallization nuclei or seed particles for the agglomeration of the metal sulfide.

A precipitation vessel for removal of metal sulfide from the methanol scrubbing solution can comprise:

an inlet for the scrubbing solution;

a heater for heating the scrubbing solution in the vessel;

an outlet at an upper portion of the vessel for methanol gas; and an outlet at a lower portion of the vessel for a liquid containing agglomerated metal sulfides.

The heater can be a steam inlet and/or heating coil in the vessel which can be provided with an inlet valve for blowing the inert gas into the vessel. The vessel can also have an inlet for introducing the sulfide particles.

The apparatus as a whole can comprise:

a methanol/water separation column in which:

a rising stream of methanol vapor is passed in counterflow to a descending stream of water, a head product rich in methanol is removed from the separation column for scrubbing of industrial gas, and a sump product rich in water is removed from the separation column; and a precipitation vessel receiving a continuous flow from the separation column of a methanol scrubbing solution containing colloidal metal sulfides from use in the scrubbing of industrial gas at a low temperature, the vessel comprising:

an inlet for the scrubbing solution, a heater for heating the scrubbing solution in the vessel, an outlet at an upper portion of the vessel for methanol gas communicating with an upper part of the column, and an outlet at a lower portion of the vessel for a liquid containing agglomerated metal sulfides communicating with a lower part of the column.

BRIEF DESCRIPTION OF THE DRAWING

The sole FIGURE of the drawing is a diagram of an apparatus for removing colloidal metal sulfide from a methanol scrubbing solution used to scrub synthesis gas.

SPECIFIC DESCRIPTION

In the drawing we have shown a system in which a precipitation vessel, i.e. a column 1 is connected at its head via a line 4 to a methanol-water separation column 6 and at its sump by a line 5 with this column 6 at an intermediate point along the height of that column. The precipitation vessel 1 is provided with an inlet 1a for a feed stock, which is methanol laden with, inter alia, metal sulfides in colloidal form formed from metal carbonyls and following a methanol scrubbing of synthesis gas in a scrubber (not shown). To this feed, water can be added via the line 3 as drawn from line 3c by a pump 3a from the sump 6a of the column 6. The precipitation vessel also has a coil ha through which superheated steam may be circulated at 11 for indirect heating of the contents of the precipitation vessel and an inlet 1b through an appropriate valve for steam from line 10 and an inlet 1c for inert In the drawing we have shown a system in which a precipitation vessel, i.e. a column 1 is connected at its head via a line 4 to a methanol-water separation column 6 and at its sump by a line 5 with this column 6 at an intermediate point along the height of that column. The precipitation vessel 1 is provided with an inlet 1a for a feed stock, which is methanol laden with, inter alia, metal sulfides in colloidal form formed from metal carbonyls and following a methanol scrubbing of synthesis gas in a scrubber (not shown). To this feed, water can be added via the line 3 as drawn from line 3c by a pump 3a from the sump 6a of the column 6. The precipitation vessel also has a coil ha through which superheated steam may be circulated at 11 for indirect heating of the contents of the precipitation vessel and an inlet 1b through an appropriate valve for steam from line 10 and an inlet 1c for inert gas from line 9. The head of the column 6 may have an outlet line 8 for methanol as a head product and a recycle line 12 may communicate with a spray head 13 introducing the recycle into the head of the column 6. The trays in the column are represented at 14.

The line 3b can carry off the water and precipitated agglomerated metal sulfide as the sump product. A boiler 7 can draw the solution from the column 6 via line 7a and return the boiling solution or vapors thereof via line 7b. The contents of the boiler are indirectly heated by steam from the line 15 and the steam which is condensed produces the condensate which is discharged at 16.

In the apparatus shown in the drawing and described previously, the precipitation vessel 1 is used for the agglomeration of metal sulfides contained in the continuous influx of the scrubbing solution 2, either as water from a portion of the column sump product 3 or from recycled water of a water scrubbing of the methanol-containing RECTISOL™ (methanol solvent at subzero temperature) waste gas. Because of the heating and the addition of water in the precipitation vessel, the agglomerated metal sulfides no longer have a tendency toward encrustation and the agglomerated metal sulfides are carried via line 5 from the precipitation vessel to the lower part of the separating column and are discharged in sump products of the separating column 6 via line 3.

For a maximum separation of the methanol in the precipitation vessel 1, the scrubbing solution there is brought to the boiling point of methanol. The heating in the precipitation vessel results in a continuous reduction of the methanol concentration by the distilling off of methanol which passes via line 4 to the upper portion of the separating column 6. The reduction in the methanol concentration is in part a result of dilution with water as described and promotes the precipitation and agglomeration of the sulfides. Sulfide particles can be added as seeds for crystallization.

In the separation column 6, methanol vapors produced in the boiler 7 which rise through the column are methanol which is removed as a head product at 8 while water and the agglomerated metal sulfide are discharged as the sump product at 3.

The feed to the methanol-water column 6, depending upon the size of the apparatus, can be between 0.5 m$^3$/h and 5 m$^3$/h and heating and dilution promotes the precipitation and agglomeration of the sulfides. Sulfide particles can be added as seeds for crystallization.

In the separation column 6, methanol vapors produced in the boiler 7 rise through the column are methanol which is removed as a head product at 8 while water and the agglomerated metal sulfide are discharged as the sump product at 3.

The feed to the methanol-water column 6, depending upon the size of the apparatus, can be between 0.5 and 5 m$^3$/h. A customary flow rate is 2 m$^3$/h.

An uncleaned RECTISOL™ scrubbing solution (methanol solvent at subzero temperature) contains, depending upon the carbonyl concentration in the crude gas, generally a solids content at the inlet of the separation column 6 of 50 to 500 mg/l of FeS and NiS in colloidal form.

At a feed rate of 2 m$^3$/h and a sulfide concentration of 200 mg/l, corresponding to 0.4 kg/h of metal sulfide in the methanol column, even with only a 20% deposition in the column, the trays can be encrusted with 1.9 kg of solids per day in a 24 hour operation.

When the precipitation vessel 1 is provided upstream of the column, the amount of encrustation can be reduced practically to zero, i.e. practically that all of the metal sulfides are removed and such that there is practically no colloidal metal sulfide in the head product.

The repair and maintenance of the column and its down time is likewise greatly reduced. The invention has been found to be highly effective for the elimination of FeS and NiS produced from metal carbonyls in the cleaning of RECTISOL™ scrubbing liquids (methanol solvent at sub-zero temperature) and as a consequence, the processing of the scrubbing liquid from a RECTISOL™ plant and the operation thereof are made significantly more economical.

We claim:

1. A method of removing colloidal metal sulfides formed from metal carbonyls from a methanol scrubbing solution used to scrub industrial gas at a low temperature, the method comprising the steps of:
   (a) introducing said methanol scrubbing solution containing colloidal metal sulfides formed from metal carbonyls into a precipitation vessel;
   (b) heating the methanol scrubbing solution containing colloidal metal sulfide particles in said precipitation vessel to cause growth of the metal sulfide particles therein;
   (c) introducing the methanol scrubbing solution containing metal sulfides from said precipitation vessel into a methanol/water separation column in which:
      a rising stream of methanol vapor is passed in counterflow to a descending stream of water,
      a head product rich in methanol is removed from said separation column for scrubbing of industrial gas, and
      a sump product rich in water is removed from said separation column; and
   (d) removing from the sump product metal sulfides from said separation column in the form of larger particles than the particles of the colloidal metal sulfides introduced according to step (a).

2. The method defined in claim 1 wherein said methanol scrubbing solution containing colloidal metal sulfides is heated in said precipitation vessel to a temperature up to the boiling point of methanol.

3. The method defined in claim 1 wherein water is continuously added to the methanol scrubbing solution containing colloidal metal sulfides heated in said precipitation vessel to lower the methanol concentration and improve agglomeration of metal sulfides therein.

4. The method defined in claim 1, further comprising the step of adding sulfide particles to the methanol scrubbing solution containing colloidal metal sulfides heated in said precipitation vessel as crystallization nuclei for agglomeration of the metal sulfides.

5. The method defined in claim 1, further comprising the steps of:
   passing said methanol scrubbing solution containing colloidalmetal sulfides continuously through said precipitation vessel,
   distilling methanol from the said methanol scrubbing solution containing colloidal metal sulfides continuously passed through the precipitation vessel during the heating thereof in step (b),
   withdrawing distilled-off methanol from a head of said precipitation vessel and introducing the distilled-off methanol into said separation column, and
   removing an aqueous solution containing precipitated metal sulfide particles at a bottom of said precipitation vessel and introducing the removed aqueous solution containing precipitated metal sulfide particles into said separation column at below the point of introduction of the distilled off methanol in the previous step.

6. The method defined in claim 5 wherein said methanol scrubbing solution containing colloidal metal sulfides is heated in said precipitation vessel to a temperature up to the boiling point of methanol.

7. The method defined in claim 6 wherein water is continuously added to the methanol scrubbing solution containing colloidal metal sulfides heated in said precipitation vessel to lower the methanol concentration and improve agglomeration of metal sulfides therein.

8. The method defined in claim 7, further comprising the step of adding sulfide particles to the methanol scrubbing solution containing colloidal metal sulfides heated in said precipitation vessel as crystallization nuclei for agglomeration of the metal sulfides.

* * * * *